(12) United States Patent
Semersky et al.

(10) Patent No.: US 7,790,255 B2
(45) Date of Patent: Sep. 7, 2010

(54) FOAMED-WALL CONTAINER HAVING A SILVERY APPEARANCE

(75) Inventors: Frank E. Semersky, Holland, OH (US); William D. Voyles, Toledo, OH (US); Eugene M. Sadzewicz, Toledo, OH (US)

(73) Assignee: Plastic Technologies, Inc., Holland, OH (US)

( * ) Notice: Subject to any disclaimer, the term of this patent is extended or adjusted under 35 U.S.C. 154(b) by 67 days.

(21) Appl. No.: 11/384,979

(22) Filed: Mar. 20, 2006

(65) Prior Publication Data

US 2007/0218231 A1    Sep. 20, 2007

(51) Int. Cl.
*B32B 3/12*    (2006.01)
*B32B 3/26*    (2006.01)

(52) U.S. Cl. ............ 428/36.5; 428/315.5; 264/51; 264/535

(58) Field of Classification Search ........ 428/36.5, 428/36.9, 315.5, 319.3, 319.7; 264/41, 50–51, 264/85, 328.1, 416, 478, 523, 535, 537
See application file for complete search history.

(56) References Cited

U.S. PATENT DOCUMENTS

| | | | | | |
|---|---|---|---|---|---|
| 3,391,051 | A | * | 7/1968 | Ehrenfreund et al. | 428/159 |
| 4,098,419 | A | * | 7/1978 | Virog et al. | 215/252 |
| 4,940,346 | A | * | 7/1990 | Liljenquist | 400/487 |
| 5,128,382 | A | * | 7/1992 | Elliott et al. | 521/178 |
| 5,370,976 | A | * | 12/1994 | Williamson et al. | 430/358 |
| 5,670,102 | A | * | 9/1997 | Perman et al. | 264/50 |
| 5,706,969 | A | * | 1/1998 | Yamada et al. | 220/592.2 |
| 5,830,548 | A | * | 11/1998 | Andersen et al. | 428/36.4 |
| 6,169,122 | B1 | * | 1/2001 | Blizard et al. | 521/79 |
| 6,169,266 | B1 | | 1/2001 | Hughes | |
| 6,232,354 | B1 | * | 5/2001 | Tan | 521/60 |
| 6,322,347 | B1 | * | 11/2001 | Xu | 425/376.1 |
| 6,358,446 | B1 | * | 3/2002 | Clarke | 264/50 |
| 6,376,059 | B1 | * | 4/2002 | Anderson et al. | 428/314.8 |
| 6,545,094 | B2 | * | 4/2003 | Oswald et al. | 525/191 |
| 6,579,910 | B2 | * | 6/2003 | Xu | 521/79 |
| 6,593,384 | B2 | * | 7/2003 | Anderson et al. | 521/97 |
| 6,706,223 | B1 | * | 3/2004 | Anderson et al. | 264/51 |
| 6,939,071 | B1 | | 9/2005 | Breidenbach et al. | |
| 7,588,810 | B2 | * | 9/2009 | Semersky | 428/36.5 |
| 2001/0010849 | A1 | * | 8/2001 | Blizard et al. | 428/36.5 |
| 2002/0114937 | A1 | * | 8/2002 | Albert et al. | 428/304.4 |
| 2003/0105176 | A1 | * | 6/2003 | Haas et al. | 521/79 |
| 2004/0038018 | A1 | * | 2/2004 | Anderson et al. | 428/304.4 |
| 2004/0080070 | A1 | * | 4/2004 | Liu et al. | 264/51 |
| 2004/0081915 | A1 | | 4/2004 | Andrews | |
| 2004/0086703 | A1 | * | 5/2004 | Semersky | 428/319.3 |
| 2004/0198853 | A1 | * | 10/2004 | Saito et al. | 521/79 |
| 2005/0181161 | A1 | * | 8/2005 | Semersky et al. | 428/36.5 |
| 2005/0256215 | A1 | * | 11/2005 | Burnham et al. | 521/79 |
| 2007/0054110 | A1 | * | 3/2007 | Kawato et al. | 428/318.4 |

OTHER PUBLICATIONS

SeriPrint, Material Safety Data Sheet, SeriInk Approximate Pantone 423, May 26, 2004.*

* cited by examiner

*Primary Examiner*—Sophie Hon
(74) *Attorney, Agent, or Firm*—Fraser Clemens Martin & Miller LLC; Donald R. Fraser

(57) ABSTRACT

A container comprises a micro cellular foamed polymer, and a non-reactive gas contained within the micro cellular foam cells, wherein the container has a silvery appearance. The process for making the container comprises injection molding a polymer preform having a non-reactive gas entrapped within the walls thereof, cooling the preform to a temperature below the polymer softening temperature, reheating the preform to a temperature above the polymer softening temperature, and blow molding the preform, to prepare a container comprising a micro cellular foamed polymer having a non-reactive gas contained within the micro cellular foam cells.

17 Claims, No Drawings

FOAMED-WALL CONTAINER HAVING A SILVERY APPEARANCE

FIELD OF THE INVENTION

The present invention relates generally to a foamed-wall polymer container having a silvery appearance. More particularly, the invention is directed to a container comprising micro cellular foam, wherein the foam micro cells contain a non-reactive gas such as nitrogen, and the container has a silvery appearance. Also contemplated as a part of the present invention is a method of manufacturing the foamed-wall container having a silvery appearance.

BACKGROUND OF THE INVENTION

Biaxially oriented single and multi-layered bottles may be manufactured from polymer materials such as, for example, polyethylene terephthalate (PET) using a hot preform process, wherein a single or multi-layered preform is heated to its desired orientation temperature and drawn and blown into conformity with a surrounding mold cavity. The preform may be prepared by any conventional process such as, for example, by extruding a preform comprising single or multiple layers of polymer, or by injecting subsequent layers of polymer over a previously injection molded preform. Generally, multiple layers are used for beverage containers, to add diffusion barrier properties not generally found in single layer containers.

The various layers of polymers in the prior art multi-layered containers are generally in intimate contact with one another, thereby facilitating the conduct of thermal energy through the walls of the containers. This allows the chilled contents of the container to quickly warm to the ambient temperature. Accordingly, such containers are often sheathed in, for example, a foamed polystyrene shell to impart thermal insulating properties to the container.

It would be desirable to prepare an improved plastic container which is opaque with unique visual properties without the addition of a coloring agent. Further, it is deemed desirable to impart thermal insulating properties to the improved plastic container. Also, it would be desirable to prepare an improved plastic container having a silvery appearance without requiring the addition of a coloring agent which would adversely effect the recycling characteristics of the container.

SUMMARY OF THE INVENTION

Accordant with the present invention, a foamed-wall container having a unique appearance has surprisingly been discovered. The container comprises a micro cellular foamed polymer, and a non-reactive gas contained within the micro cellular foam cells, wherein the container has a silvery appearance without the addition of a coloring agent.

Also contemplated as an embodiment of the invention is a process for preparing a foamed-wall container having a unique appearance. The process comprises the steps of injection molding a polymer preform having a non-reactive gas entrapped within the walls thereof, cooling the preform to a temperature below the polymer softening temperature, reheating the preform to a temperature above the polymer softening temperature, and blow molding the preform, to prepare a container comprising a micro cellular foamed polymer having a non-reactive gas contained within the micro cellular foam cells, wherein the container has a silvery appearance.

The container according to the present invention is particularly useful for packaging carbonated beverages.

DETAILED DESCRIPTION OF THE PREFERRED EMBODIMENT

The present invention is directed to a foamed-wall container having a unique appearance, comprising a micro cellular foamed polymer, and a non-reactive gas contained within the micro cellular foam cells, wherein the container has a silvery appearance.

Another embodiment of the present invention is directed to a process for making a foamed-wall container having a unique appearance, comprising injection molding a polymer preform having a non-reactive gas entrapped within the walls thereof, cooling the preform to a temperature below the polymer softening temperature, reheating the preform to a temperature above the polymer softening temperature, and blow molding the preform, to prepare a container comprising a micro cellular foamed polymer having a non-reactive gas contained within the micro cellular foam cells, wherein the container has a silvery appearance.

Suitable polymers from which the container may be prepared include, but are not necessarily limited to, polyethylene terephthalate (PET) and other polyesters, polypropylene, acrylonitrile acid esters, vinyl chlorides, polyolefins, polyamides, and the like, as well as derivatives, blends, and copolymers thereof. A suitable polymer for commercial purposes is PET.

Polymer flakes are melted in a conventional plasticizing screw extruder, to prepare a homogeneous stream of hot polymer melt at the extruder discharge. Typically, the temperature of the polymer melt stream discharged from the extruder ranges from about 225 degrees Centigrade to about 325 degrees Centigrade. One ordinarily skilled in the art will appreciate that the temperature of the polymer melt stream will be determined by several factors, including the kind of polymer flakes used, the energy supplied to the extruder screw, etc. As an example, PET is conventionally extruded at a temperature from about 260 degrees Centigrade to about 290 degrees Centigrade. A non-reactive gas is injected under pressure into the extruder mixing zone, to ultimately cause the entrapment of the gas as micro cellular voids within the polymer material. By the term "non-reactive gas" as it is used herein is meant a gas that is substantially inert vis-à-vis the polymer. Preferred non-reactive gases comprise carbon dioxide, nitrogen, and argon, as well as mixtures of these gases with each other or with other gasses.

According to the present invention, the extrudate is injection molded to form a polymer preform having the non-reactive gas entrapped within the walls thereof. Methods and apparatus for injection molding a polymer preform are well-known in the art.

It is well-known that the density of amorphous PET is 1.335 grams per cubic centimeter. It is also known that the density of PET in the melt phase is about 1.200 grams per cubic centimeter. Thus, if the preform injection cavity is filled completely with molten PET and allowed to cool, the resulting preform would not exhibit the proper weight and would have many serious deficiencies, such as sink marks. The prior art injection molding literature teaches that, in order to offset the difference in the densities of amorphous and molten PET, a small amount of polymer material must be added to the part after the cavity has been filled and as the material is cooling. This is called the packing pressure. Thus, about ten percent more material must be added during the packing pressure phase of the injection molding cycle in order to insure that a preform made by injection molding is filled adequately and fully formed. The packing pressure phase of the injection molding operation is likewise used for polymer materials other than PET.

According to the present invention however, the polymer preform is injection molded and simultaneously foamed using a non-reactive gas. The gas is entrained in the material during the injection phase. Contrary to the prior art injection molding process, wherein additional polymer material is injected during the packing phase, the present invention utilizes minimal packing pressure. As the polymer material is still in a molten state, the partial pressure of the non-reactive gas is sufficient to permit the release of the dissolved gas from the polymer into the gas phase where it forms the micro cellular foam structure. Thus, the preform made by the inventive process weighs less than, but has the same form and geometry as, the polymer preforms produced by the conventional injection molding operations that employ the packing process.

The micro cells may contain one or more of a variety of gases typically used in processes for making micro cellular foam structures. In one commercially acceptable embodiment, the non-reactive gas comprises carbon dioxide in a concentration of at least ten percent by weight of the total weight of the non-reactive gas. This level of carbon dioxide concentration provides adequate partial pressure to retard the diffusion of carbon dioxide from a carbonated beverage within the inventive container to the exterior atmosphere. The micro cellular foam tends to act as an effective thermal insulator, to retard the conduct of heat energy from the atmosphere to the chilled carbonated beverage within the container Upon completion of the injection molding step, the preform is cooled to a temperature below the polymer softening temperature. For example, the softening temperature for PET is approximately 70 degrees Centigrade. Thus, the entrapped non-reactive gas is retained within the walls of the polymer preform. This cooling step conditions the polymer and preserves its desirable properties for the successful preparation of a blow molded container. This cooling step is also useful when employing polymers such as polyesters, which cannot be blow molded directly from an extruded parison. This cooling step may be effected by any conventional process used in the polymer forming art such as, for example, by passing a stream of a cooling gas over the surfaces of the preform, or cooling the preform while in-mold by cooling the forming mold.

The preform is thereafter reheated to a temperature above the polymer softening temperature. This heating step may be effected by well-known means such as, for example, by exposure of the preform to a hot gas stream, by flame impingement, by exposure to infra-red energy, by passing the preform through a conventional oven, or the like. PET is generally reheated to a temperature twenty to twenty-five degrees above its softening temperature for the subsequent blow molding operation. If PET is reheated too far above its glass transition temperature, or held at a temperature above its softening temperature for an excessive period of time, the PET undesirably will begin to crystallize and turn white. Likewise, if the preform is heated to a temperature above which the mechanical properties of the material are exceeded by the increasing pressure of the non-reactive gas in the micro cells, the micro cells undesirably will begin to expand thus distorting the preform.

Finally, the preform is blow molded, to prepare a container, consisting essentially of a micro cellular foamed polymer having a non-reactive gas contained within the micro cellular foam cells. Methods and apparatus for blow molding a container from a polymer preform are well-known.

The blow molded foamed-wall polymer container so produced has a silvery appearance; as though the container were made of metal. The blow molded container is silvery in color, and may exhibit Pantone Color Formula Guide numbers in the range of about 420 through 425, 877, 8001, 8400, and 8420. While not wishing to be bound by any particular theory regarding the reason that the ultimately produced container has a unique silvery appearance, it is believed that, as the preform cavity is being filled with polymer, bubbles of gas are formed at the flow front of the polymer due to the pressure drop between the dissolved gas and the relatively lower pressure in the preform cavity. The bubbles formed at the flow front of the polymer material as it is introduced into the preform cavity are subsequently deposited on the outside and inside surfaces of the preform, thus resulting in a preform having foamed and unfoamed regions.

From the forgoing description, one ordinarily skilled in the art can easily ascertain the essential characteristics of the invention, and without departing from its spirit and scope, can make various changes and modifications to adapt the invention to various uses and conditions.

What is claimed is:

1. A blow molded container, comprising:
    a micro cellular foamed polymer formed without a chemical blowing agent suitable for blow molding having micro cellular foam cells, comprising polyethylene terephthalate; and
    a non-reactive gas contained within the micro cellular foam cells comprising one or more of carbon dioxide, nitrogen, or argon, wherein the color of the blow molded container is Pantone Color Formula Guide number 420, 421, 422, 423, 424, 425, 877, 8001, 8400, or 8420 without the use of a colorant.

2. A blow molded container, comprising:
    a micro cellular foamed polyethylene terephthalate formed without a chemical blowing agent suitable for blow molding having micro cellular foam cells; and
    a non-reactive gas comprising nitrogen contained within the micro cellular foam cells, wherein the color of the blow molded container is Pantone Color Formula Guide number 877 without the use of a colorant.

3. A process for preparing a container, comprising the steps of:
    injection molding a polymer preform having a non-reactive gas entrapped within the walls thereof;
    cooling the preform to a temperature below the polymer softening temperature;
    reheating the preform to a temperature greater than the polymer softening temperature; and
    blow molding the preform, to prepare a plastic container having a silvery appearance without the use of a colorant, consisting essentially of a micro cellular foamed polymer having the non-reactive gas contained within the micro cellular foam cells; and
    the silvery appearance without the use of a colorant is as though the plastic container were made of metal having a silver color.

4. The process for preparing a container according to claim 3, wherein the polymer comprises one or more of a polyester, polypropylene, acrylonitrile acid ester, vinyl chloride, polyolefin, polyamide, or a derivative or copolymer thereof.

5. The process for preparing a container according to claim 3, wherein the polymer comprises polyethylene terephthalate.

6. The process for preparing a container according to claim 3, wherein the non-reactive gas comprises one or more of carbon dioxide, nitrogen, or argon.

7. The process for preparing a container according to claim 3, wherein the non-reactive gas comprises nitrogen.

8. The process for preparing a container according to claim 3, wherein the non-reactive gas comprises nitrogen at a concentration of at least 10% by weight.

9. The process for preparing a container according to claim 3, wherein the silver color of the container is Pantone Color Formula Guide number 420, 421, 422, 423, 424, 425, 877, 8001, 8400, or 8420.

10. A process for preparing a container, comprising the steps of:
   injection molding a preform comprising a polymer comprising one or more of a polyester, polypropylene, acrylonitrile acid ester polymer, vinyl chloride polymer, polyolefin, polyamide, or a derivative or copolymer thereof, the preform having a non-reactive gas comprising one or more of carbon dioxide, nitrogen, or argon entrapped within the walls thereof;
   cooling the preform to a temperature below about 70 degrees Centigrade;
   reheating the preform to a temperature above about 70 degrees Centigrade; and
   blow molding the preform, to prepare a plastic container having a silvery appearance without the use of a colorant comprising a micro cellular foamed polymer having the non-reactive gas contained within the micro cellular foam cells; and
   the silvery appearance without the use of a colorant is as though the plastic container were made of a metal having a silver color.

11. The process for preparing a container according to claim 10, wherein the polymer comprises polyethylene terephthalate.

12. The process for preparing a container according to claim 10, wherein the non-reactive gas comprises nitrogen.

13. The process for preparing a container according to claim 10, wherein the non-reactive gas comprises nitrogen at a concentration of at least 10% by weight.

14. The process for preparing a container according to claim 10, wherein the silver color of the container is about Pantone Color Formula Guide number 420, 421, 422, 423, 424, 425, or 877.

15. A process for preparing a micro cellular preform suitable for blow molding a plastic container comprising the steps of:
   injection molding a micro cellular polymer preform having a non-reactive gas entrapped within the walls thereof;
   cooling the preform to a temperature below the polymer softening temperature; and
   reheating the preform to a temperature above the glass transition temperature of the polymer and below the temperature at which the increasing pressure of the micro cellular gas bubbles exceeds that of the ability of the polymer preform material properties to resist and the micro cellular bubbles expand to result in a distorted preform, wherein the micro cellular preform comprises a hollow body having a silvery appearance without the use of a colorant and the silvery appearance is as though the preform of the plastic container were made of metal having a silver color.

16. A plastic container produced from a micro cellular preform prepared by the process according to claim 15 including the steps of:
   blow molding the reheated preform to prepare a plastic container having a silvery appearance without the use of a colorant, consisting essentially of a micro cellular foamed polymer having a non-reactive gas contained within the micro cellular foam cells; wherein the silvery appearance is as though the plastic container were made of metal having a silver color.

17. A plastic container produced according to claim 16 wherein the insulating properties of the container are proportional to the percentage of micro cellular foam in the microcellular preform.

* * * * *